United States Patent
Kubala et al.

(10) Patent No.: US 10,210,109 B2
(45) Date of Patent: *Feb. 19, 2019

(54) PRE-ALLOCATING MEMORY BUFFERS BY PHYSICAL PROCESSOR AND USING A BITMAP METADATA IN A CONTROL PROGRAM

(71) Applicant: International Business Machines Corporation, Armonk, NY (US)

(72) Inventors: Jeffrey P. Kubala, Poughquag, NY (US); Jerry A. Moody, Beekman, NY (US); Muruganandam Somasundaram, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,271

(22) Filed: Feb. 10, 2017

(65) Prior Publication Data

US 2018/0150223 A1    May 31, 2018

Related U.S. Application Data

(63) Continuation of application No. 15/362,908, filed on Nov. 29, 2016.

(51) Int. Cl.
*G06F 3/06* (2006.01)
*G06F 5/14* (2006.01)
(Continued)

(52) U.S. Cl.
CPC ........ *G06F 13/1673* (2013.01); *G06F 3/0604* (2013.01); *G06F 3/067* (2013.01);
(Continued)

(58) Field of Classification Search
CPC .... G06F 3/0504; G06F 3/0631; G06F 3/0632; G06F 3/0656; G06F 3/067;
(Continued)

(56) References Cited

U.S. PATENT DOCUMENTS

| | | | |
|---|---|---|---|
| 6,571,259 B1* | 5/2003 | Zheng | G06F 17/30067 |
| 6,757,803 B1* | 6/2004 | Lin | G06F 9/5016 |
| | | | 711/152 |

(Continued)

OTHER PUBLICATIONS

List of IBM Patents or Patent Applications Treated as Related (Appendix P), Filed Jun. 25, 2018, 2 pages.

*Primary Examiner* — Thomas J Cleary
(74) *Attorney, Agent, or Firm* — Cantor Colburn LLP; Steven Chiu

(57) ABSTRACT

Aspects of the present invention include a method, system and computer program product that implements a memory management scheme for each processor in a multiprocessor system. The method includes pre-allocating, for each processor in a multiprocessor system, a set of memory buffers; and implementing a metadata bitmap for each pre-allocated set of memory buffers, wherein the metadata bitmap for each pre-allocated set of memory buffers comprises a plurality of bits, and wherein each of the plurality of bits is indicative of a usage state of a corresponding one of the memory buffers within each pre-allocated set of memory buffers.

7 Claims, 5 Drawing Sheets

(51) Int. Cl.
*G06F 12/02* (2006.01)
*G06F 13/16* (2006.01)

(52) U.S. Cl.
CPC .......... *G06F 3/0631* (2013.01); *G06F 3/0656* (2013.01); *G06F 5/14* (2013.01); *G06F 12/023* (2013.01); *G06F 2205/126* (2013.01); *G06F 2212/1044* (2013.01)

(58) Field of Classification Search
CPC ... G06F 2003/0691; G06F 2009/45583; G06F 12/02; G06F 9/50; G06F 9/5016; G06F 13/1668; G06F 13/1673; G06F 17/30324; G06F 3/0604; G06F 12/023; G06F 5/14; G06F 2205/126; G06F 2212/1044
See application file for complete search history.

(56) References Cited

U.S. PATENT DOCUMENTS

| | | | | |
|---|---|---|---|---|
| 6,874,062 B1* | 3/2005 | Goldberg | .............. | G06F 3/0613 707/999.003 |
| 7,676,514 B2* | 3/2010 | Faibish | ................... | G06F 3/061 707/646 |
| 7,904,618 B2* | 3/2011 | Inoue | ........................ | G06F 5/10 707/752 |
| 8,806,154 B1* | 8/2014 | Gupta | ................ | G06F 11/1448 711/156 |
| 9,678,865 B1* | 6/2017 | Kubala | ............... | G06F 12/0284 |
| 9,898,197 B1* | 2/2018 | Gao | ........................ | G06F 3/061 |
| 2005/0144402 A1* | 6/2005 | Beverly | ............. | G06F 12/1475 711/152 |
| 2007/0260842 A1* | 11/2007 | Faibish | ................... | G06F 3/061 711/170 |
| 2010/0082920 A1* | 4/2010 | Larson | ............... | G06F 11/1662 711/162 |
| 2012/0260017 A1* | 10/2012 | Mine | ....................... | G06F 9/544 710/308 |
| 2013/0024486 A1* | 1/2013 | Patwardhan | .......... | G06F 3/0608 707/827 |
| 2015/0370713 A1* | 12/2015 | Morishita | ............... | G06F 13/10 711/119 |
| 2018/0150416 A1 | 5/2018 | Kubala et al. | | |
| 2018/0150417 A1 | 5/2018 | Kubala et al. | | |

* cited by examiner

PRE-ALLOCATING MEMORY BUFFERS BY PHYSICAL PROCESSOR AND USING A BITMAP METADATA IN A CONTROL PROGRAM

CROSS-REFERENCE TO RELATED APPLICATIONS

The present application is a continuation application of U.S. patent application Ser. No. 15/362,908 filed on Nov. 29, 2016, the contents of which are incorporated herein by reference.

BACKGROUND

The present application relates to computer systems, and more specifically, to multiprocessor computer systems having a memory management scheme.

A multiprocessor computer system also referred to as a multiprocessor system, or simply a multiprocessor, includes a collection of independent processing units, which can execute multiple instructions in parallel, substantially increasing processing speed. A group of processing units within the multiprocessor can be defined as a node or cluster where each processing unit of the node executes instructions of one or a few processes to enable efficient, parallel processing of those processes. Some advanced multiprocessors contain multiple nodes and assign processes to different nodes in the system to provide parallel processing of multiple processes.

SUMMARY

According to one or more embodiments of the present invention, a computer-implemented method includes pre-allocating, for each processor in a multiprocessor system, a set of memory buffers; and implementing a metadata bitmap for each pre-allocated set of memory buffers, wherein the metadata bitmap for each pre-allocated set of memory buffers comprises a plurality of bits, and wherein each of the plurality of bits is indicative of a usage state of a corresponding one of the memory buffers within each pre-allocated set of memory buffers.

According to another embodiment of the present invention, a system includes a processor in communication with one or more types of memory, the processor configured to pre-allocate, for each processor in a multiprocessor system, a set of memory buffers; and to implement a metadata bitmap for each pre-allocated set of memory buffers, wherein the metadata bitmap for each pre-allocated set of memory buffers comprises a plurality of bits, and wherein each of the plurality of bits is indicative of a usage state of a corresponding one of the memory buffers within each pre-allocated set of memory buffers.

According to yet another embodiment of the present invention, a computer program product includes a non-transitory storage medium readable by a processing circuit and storing instructions for execution by the processing circuit for performing a method that includes pre-allocating, for each processing circuit in a multiprocessing circuit system, a set of memory buffers; and implementing a metadata bitmap for each pre-allocated set of memory buffers, wherein the metadata bitmap for each pre-allocated set of memory buffers comprises a plurality of bits, and wherein each of the plurality of bits is indicative of a usage state of a corresponding one of the memory buffers within each pre-allocated set of memory buffers.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Described herein are technical solutions for memory allocation in multiprocessor systems. For example, the technical solutions facilitate the pre-allocation of memory buffers by each processor in the multiprocessor system. As such, the technical solutions are rooted in and/or tied to computer technology in order to overcome a problem specifically arising in the realm of computers, specifically multiprocessor systems.

Figure 1:
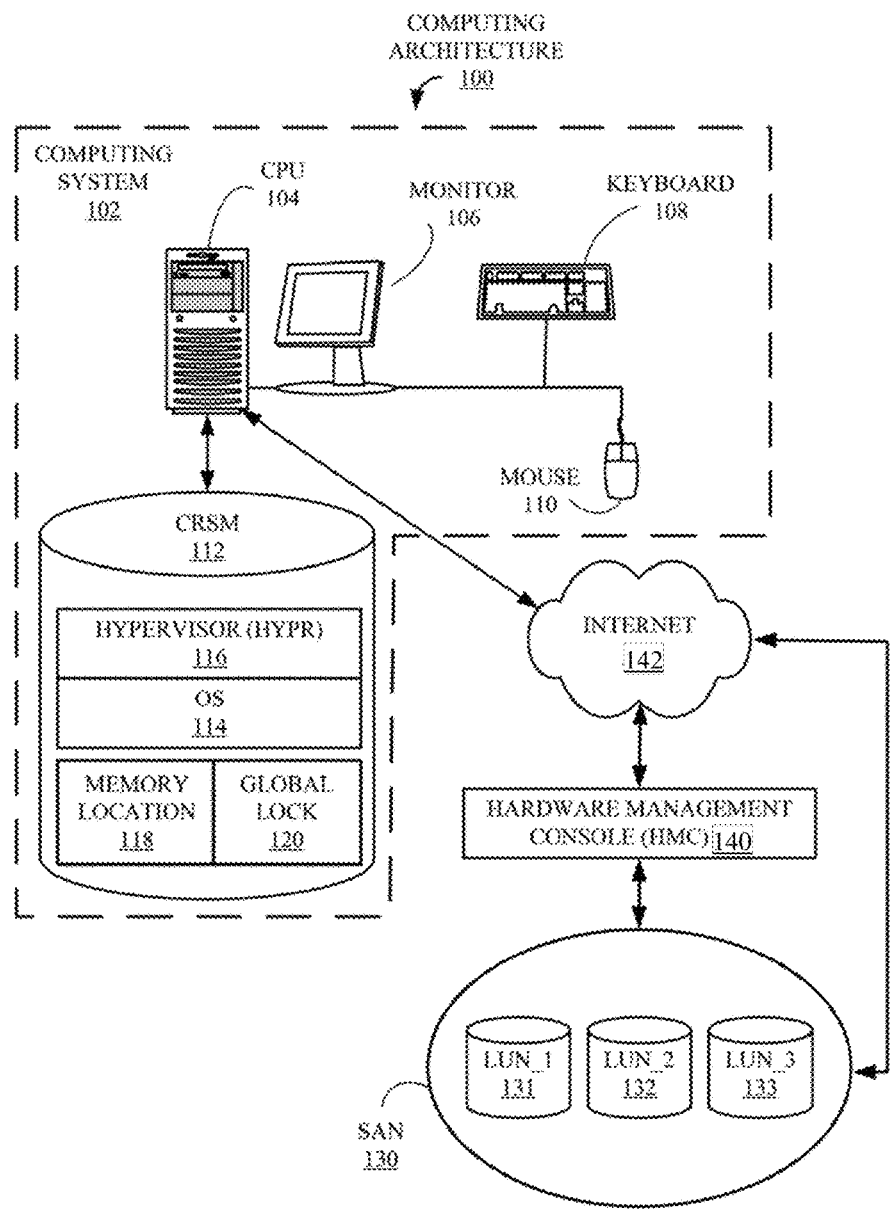
FIG. 1 is a block diagram of a computing architecture, according to one or more embodiments of the present invention.

FIG. 1 is a computing architecture 100 on which the technical solutions described herein may be implemented. A computing system 102 includes a central processing unit (CPU) 104, coupled to a monitor 106, a keyboard 108 and a pointing device, or "mouse," 110, which together facilitate human interaction with components of computing system architecture 100 and computing system 102. Also included in computing system 102 and attached to CPU 104 is a computer-readable storage medium (CRSM) 112, which may be either dynamic or non-dynamic memory and incorporated into computing system 102, i.e., an internal device, or attached externally to CPU 104 by means of various, commonly available connection devices such as but not limited to, a universal serial bus (USB) port (not shown). CRSM 112 is illustrated storing an operating system (OS) 114, a hypervisor (HYPR) 116, a memory location 118 and a global lock 120, associated with memory location 118 and implemented in accordance with the disclosed technology.

Computing system 102 is connected to the Internet 142, which is also connected to a hardware management console (HMC) 140. Although in this example, computing system 102 and HMC 140 are communicatively coupled via the internet 142, they could also be coupled through any number of communication mediums such as, but not limited to, a local area network (LAN) and a wide area network (WAN). The HMC 140 enables an administrator to configure and control the various elements of computing architecture 100, including, but not limited to, computing system 102, HYPR 116 and a storage area network (SAN) 130. SAN 130 is illustrated as containing three storage devices, or logical units, i.e. a LUN-1 131, a LUN-2 132 and a LUN-3 133. It should be noted there are many possible computing system configurations, of which computing system architecture 100 is only one simple example employed herein as an example of one system that may implement the technical solutions described herein.

Figure 2:
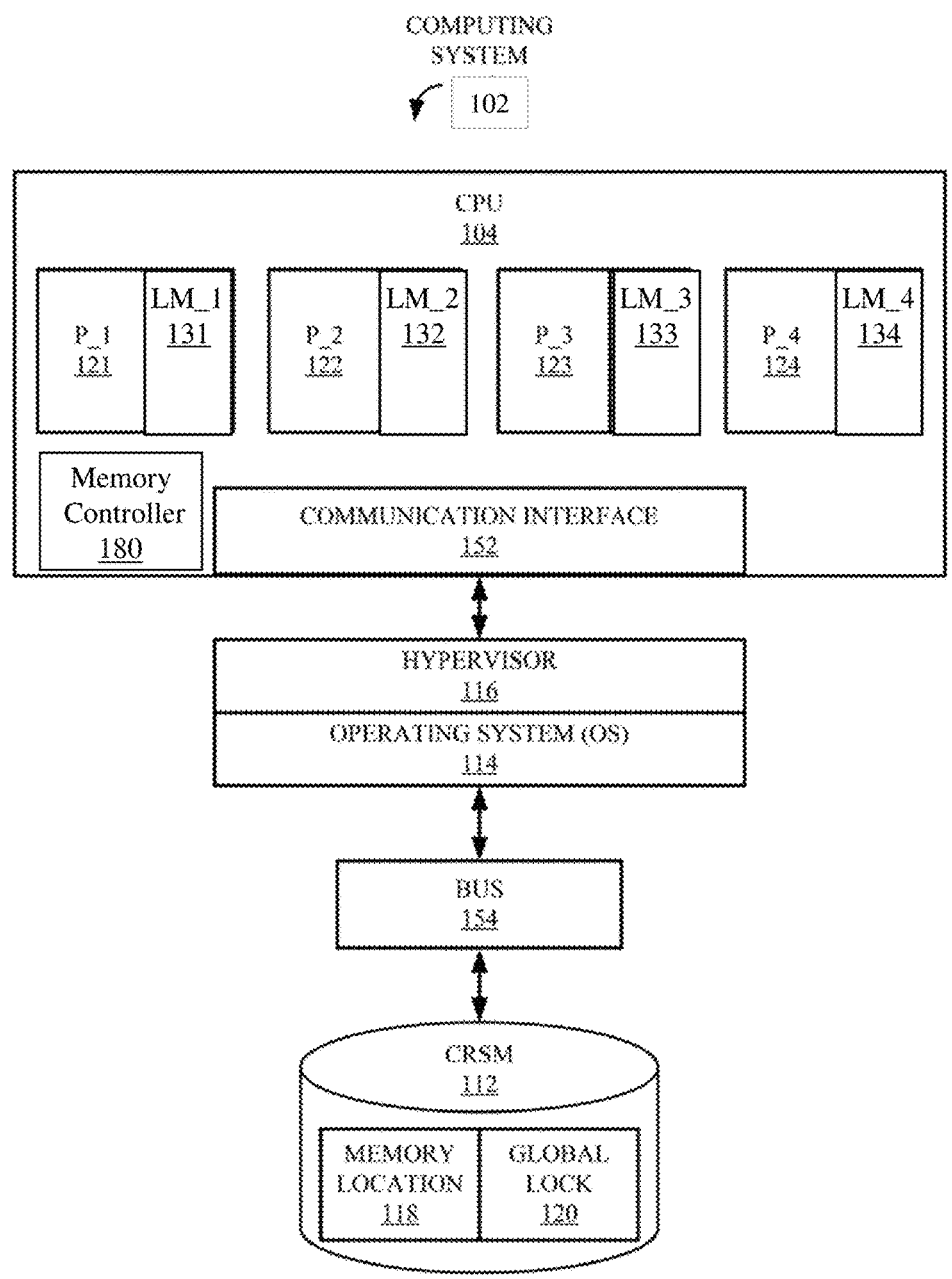
FIG. 2 is a block diagram showing elements of a multiprocessor system, according to one or more embodiments of the present invention.

FIG. 2 is a block diagram showing elements of FIG. 1 in more detail. Included from FIG. 1 are CPU 104, CRSM 112, OS 114, HYPR 116, memory location 118 and global lock 120. Also illustrated are several processing units associated with the CPU 104, i.e., a processing unit 1, or "P-1," 121, a processing unit 2, or "P-2," 122, a processing unit 3, or "P-3," 123 and a processing unit 4, "P-4," 124. Each of the processing units 121-124 is coupled to a local memory, i.e., a LM-1 131, a LM-2 132, a LM-3 133, and a LM-4 134, respectively. It should be noted that in other examples, the CPU 104 may include a different number of processing units than those in the example(s) herein. Thus, the computing system 102 and the CPU 104 may be considered to comprise a multiprocessor system.

Further, the CPU 104 includes a memory controller 180 that facilitates the processing units 121-124 to, for example, allocate and deallocate buffers from the CRSM 112. In one or more examples, the memory controller 180 further facilitates the processing units 121-124 to carry out various operations with respect to the CRSM 112, for example, to pre-allocate by each processor in a multiprocessor system a memory buffer within the CRSM 112 and to use bitmap metadata for each memory buffer to keep track of the contents of the corresponding memory buffer, according to one or more embodiments of the present invention. The memory controller 180 may also assign and remove/free one or more pre-allocated buffers from the CRSM 112 for use for a work-item. Accordingly, the memory controller 180 receives commands/instructions from one or more of the processing units 121-124 to carry out these operations.

A communication interface 152 handles communication between CPU 104 and both OS 114 and HYPR 116. A communication bus 154 provides a path for signals to be transmitted among CPU 104, processing units 121-124, communication interface 152, OS 114, HYPR 116 and CRSM 112.

Figure 3:
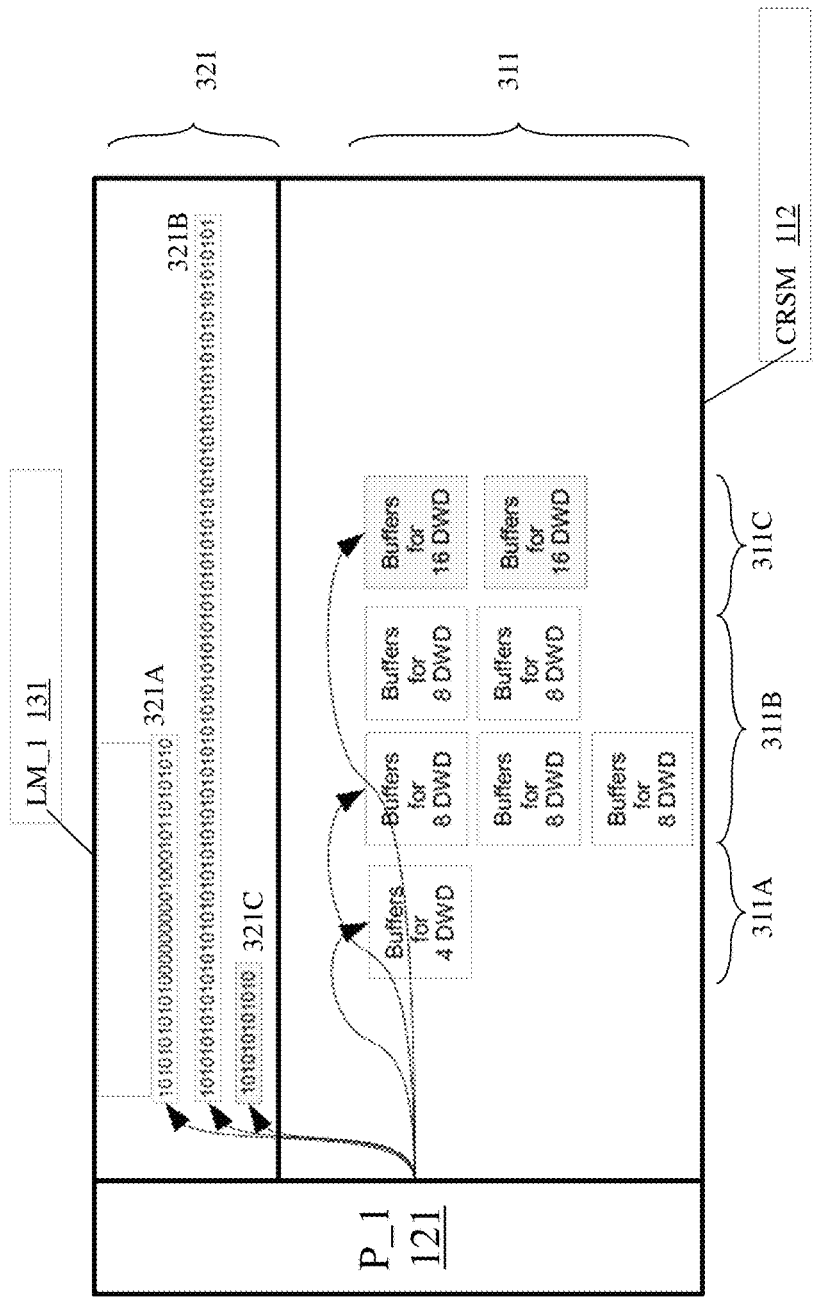
FIG. 3 is a block diagram that illustrates a memory management scheme used by processing units of a multiprocessor system, according to one or more embodiments of the present invention.
Figure 4:
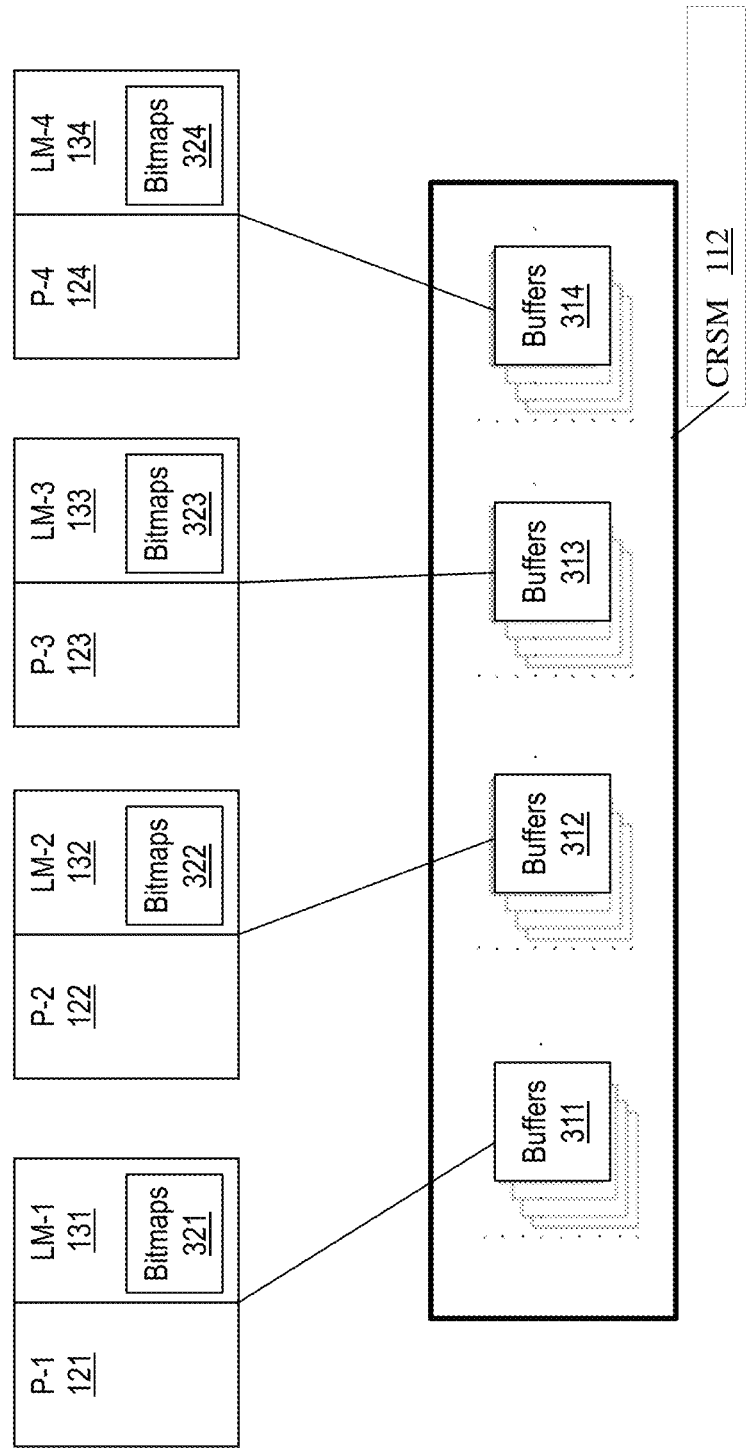
FIG. 4 is a block diagram that illustrates the pre-allocation of buffers in a memory by processing units of a multiprocessor system, according to one or more embodiments of the present invention.

Referring to FIGS. 3 and 4, there illustrated is a memory management scheme used by each processing unit 121-124 in accordance with embodiments of the present invention. For illustration, the processing unit P-1 121 is being used as an example with the understanding that the example of the processing unit P-1 121 described herein is equally applicable to the other processing units P-2 122, P-3 123, P-4 124, and any other processing units that may be located within the multiprocessor system 102.

Figure 5:
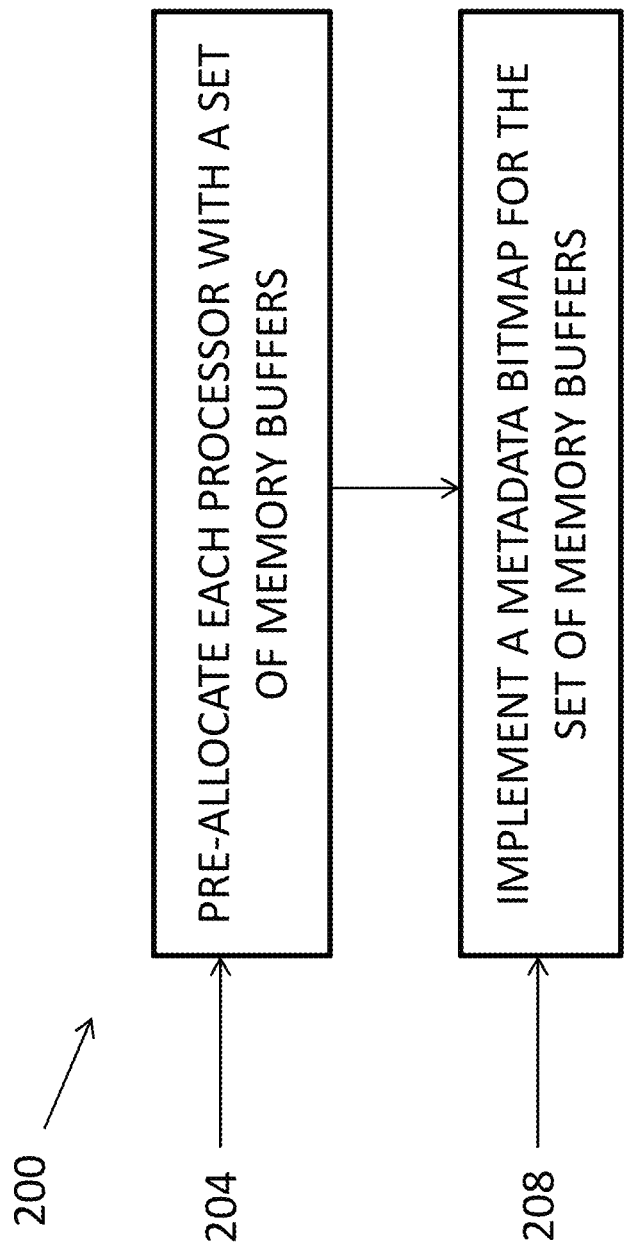
FIG. 5 is a flowchart of a method for pre-allocating a memory buffer by each processor in a multiprocessor system and implements a metadata bitmap for each memory buffer to keep track of the contents of the corresponding memory buffer, according to one or more embodiments of the present invention.

Referring also to FIG. 5, there illustrated is a flowchart of a method 200 for pre-allocating a memory buffer by or for each processor in a multiprocessor system and using bitmap metadata for each memory buffer to keep track of the contents of the corresponding memory buffer, according to one or more embodiments of the present invention. That is, a respective one of the processing units 121-124 may be used to carry out the operations in the method 200. In the alternative, the memory controller 180 may carry out the operations in the method for a selective one or more of the processing units 121-124, typically at the command of the processing units 121-124.

As illustrated, in an operation in block 204 in the method 200, the processing unit P-1 121 pre-allocates multiple sets of local memory buffers 311 of predetermined sizes in the CRSM 112. For example, P-1 121 pre-allocates the multiple sets of memory buffers 311 at startup or at some other point in time. In one or more examples, the processing unit P-1 121 pre-allocates a predetermined number of buffers of different types, where a type of a buffer may be based on a specific size of the buffer. For example, in the illustrated scenario of FIG. 3, P-1 121 pre-allocates a first set of buffers 311A of 4 double words (DWD) each, a second set of buffers 311B of 8 DWD each, and a third set of buffers 311V of 16 DWD each. It should be noted that in other examples, the P-1 121 may pre-allocate memory buffers having sizes that are different from those in the above example scenario. In the alternative, a processing unit P-1 121-P-4 124 may pre-allocate memory buffers of the same size.

In further accordance with embodiments of the present invention, in an operation in block 208 in the method 200, the processing unit P-1 121 uses or implements a set of bitmaps 321 in the local memory 131 to maintain metadata corresponding to the sets of buffers 311. In one or more examples, P-1 121 maintains a set of bitmaps 321 for each respective set of buffers 311A-311C. For example, the set of bitmaps 321 includes multiple bitmaps 321A-321C respectively corresponding to the different types or sizes of buffers 311A-311C. Each of the bitmaps 321A-321C includes a bit corresponding to a specific memory buffer from the corresponding set of buffers 311A-311C. For example, a first bitmap 321A includes a bit corresponding to each respective memory buffer from the first set of memory buffers 311A. The bitmap 321B includes a bit corresponding to each respective buffer from the second set of buffers 311B. The bitmap 321C includes a bit corresponding to each respective buffer from the third set of buffers 311C. For example, when P-1 assigns a buffer from the set of buffers 311 for use, P-1 sets (or clears) the corresponding bit from the bitmaps 321, and when the buffer is freed/removed from use, the corresponding bit is cleared (i.e., set to 0) or set to 1. That is, the bitmaps 321 are used for state transitions which indicate if a buffer is available for use, or if it has already been allocated for use by a processor and will become available once the processor frees the buffer.

In one or more examples, each of the processing units 121-124 may utilize an identical memory management scheme as just described for pre-allocating local memory buffers in the respective local memory 131-134 and maintaining metadata in corresponding bitmaps.

FIG. 4 illustrates that the processing unit P-1 121 pre-allocates the buffers 311 in the CRSM 112 and maintains the corresponding metadata in the bitmaps 321 in the local memory 131. Similarly, the processing unit P-2 122 pre-allocates buffers 312 in the CRSM 112 and maintains the corresponding metadata in bitmaps 322 in the local memory 132. Further, the processing unit P-3 123 pre-allocates buffers 313 in the CRSM 112 and maintains the corresponding metadata in bitmaps 323 in the local memory 133. Still further, the processing unit P-4 124 pre-allocates buffers 314 in the CRSM 112 and maintains the corresponding metadata in bitmaps 324 in the local memory 134. The predetermined sizes of the buffers pre-allocated by each of the processing units 121-124 may be identical. Moreover, each of the processing units 121-124 may pre-allocate an identical number of buffers of each predetermined size. The processing units 121-124 may pre-allocate the buffers 310 in the CRSM 112 by commanding the memory controller 180.

Alternatively, each of the processing units 121-124 pre-allocates a different number and/or sizes of buffers 311-314. Each of the processing units 121-124 may keep a data structure, such as a table, that indicates a number of sets of pre-allocated buffers, sizes of each buffer in each set of the pre-allocated buffers, and starting address of each set of pre-allocated buffers, among other information. The data structure is maintained in the respective local memory 131-134 of the processing units 121-124.

In one or more examples, the processing units 121-124 pre-allocate the respective buffers 311-314 in a predetermined sequence upon startup of the CPU 104. For example, P-1 pre-allocates the buffers 311, then P-2 pre-allocates the buffers 312, then P-3 pre-allocates the buffers 313, and then P-4 pre-allocates the buffers 314. Further, in one or more examples, each of the processing units 121-124 pre-allocates the corresponding buffers 311-314 at successive locations in the CRSM 112.

Still further, each of the processing units 121-124 pre-allocates the predetermined number of buffers of each type in sequence within the respective sets of pre-allocated buffers 311-314. For example, referring back to the sets of buffers 311A-311C, the processing unit P-1 121 pre-allocates N1 buffers of 4 DWD each, N2 buffers of 8 DWD each, and N3 buffers of 16 DWD each in that order. In one or more examples, P-1 121 keeps track of starting addresses of each set of buffers 311A-311C. Accordingly, given a memory address within a range of memory addresses spanned by the buffers 311, a buffer containing the memory address can be identified.

Embodiments of the present invention eliminate the problems related to contention issues associated with prior art memory subpool arrangements.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer-implemented method, comprising:
   pre-allocating, for each processor in a multiprocessor system, multiple sets of memory buffers in a shared computer readable storage medium accessible by each processor in the multiprocessor system; and
   implementing a set of metadata bitmaps for the multiple sets of pre-allocated memory buffers, wherein the set of metadata bitmaps for the multiple sets of pre-allocated memory buffers is stored in a local memory of a processor of the multiprocessor system for which the set of memory buffers are pre-allocated, and wherein a plurality of bits of one of the metadata bitmaps of the set of metadata bitmaps for each processor is indicative of a usage state of a corresponding one of the set of memory buffers within the multiple sets of pre-allocated memory buffers for each processor.

2. The computer implemented method of claim 1 wherein pre-allocating, for each processor in a multiprocessor system, multiple sets of memory buffers and implementing a set of metadata bitmaps for the multiple sets of pre-allocated memory buffers are performed by a memory controller.

3. The computer implemented method of claim 1 wherein pre-allocating, for each processor in a multiprocessor system, multiple sets of memory buffers comprises pre-allocating, for each processor in a multiprocessor system, the multiple sets of memory buffers at a time other than at start-up of the multiprocessor system.

4. The computer implemented method of claim 3 wherein implementing a set of metadata bitmaps for the multiple sets of pre-allocated memory buffers comprises implementing a metadata bitmap for each set of pre-allocated memory buffers within the multiple sets of pre-allocated memory buffers.

5. The computer implemented method of claim 1 wherein each memory buffer within each pre-allocated set of memory buffers is of a different size from one another.

6. The computer implemented method of claim 1 further comprising implementing a data structure in memory that indicates a number of sets of the pre-allocated buffers, a size of each buffer in each set of the pre-allocated buffers, and a starting address of each set of the pre-allocated buffers.

7. The computer implemented method of claim 1 wherein pre-allocating, for each processor in a multiprocessor system, multiple sets of memory buffers and implementing a set of metadata bitmaps for multiple sets of pre-allocated memory buffers are performed at start-up of the multiprocessor system.

* * * * *